INVENTOR.
FRANK L. LANDON
BY HIS ATTORNEYS
HARRIS, KIECH, RUSSELL & KERN 3,292,859

PROCESS AND GUN FOR USE IN APPLICATION OF PARTICULATE MATERIALS

Frank L. Landon, Glendora, Calif., assignor to Polymer Engineering Corporation, Azusa, Calif., a corporation of California Filed Aug. 13, 1965, Ser. No. 482,024
15 Claims. (Cl. 239—9)

This is a continuation-in-part of application Serial No. 343,619, filed February 10, 1964, now abandoned.

This invention relates to spray guns and processes for use in application of particulate material and, more particularly, provides a novel gun, spray gun installation, and process for delivering a stream of solid particles through a liquid mist of, for example, an adhesive-like material, the mist being generated by the gun. The invention also comprises a novel process for purging small passages of a spray gun of difficult to remove aqueous synthetic rubber latex. The improved process, gun and spray gun installation of the present invention are particularly adapted to the formation of a shock-absorbing structure about an object disposed in a shipping container or the like. While the gun is especially designed for this use, it may be employed in some other settings where it is desired to coat other solid, light weight particles with a liquid mist formed externally of the gun.

Container-packed objects are conventionally protected against breakage by excelsior or other shredded material. The shock that may be absorbed by such packing is relatively limited. This is especially true of a carton packed with a heavy object such as a typewriter or an industrial container for light machinery. These and other disadvantages of conventional packing make attractive the development of a procedure for the in situ formation of a shock absorbing insulation structure about an article in a container. The insulation structure will normally be integral with the container and will closely envelope the packed object.

The improved spray gun of the present invention delivers insulation particles through a latex-air mist formed externally of the gun to the interior of the carton or other container. The latex-coated particles adhere to the container and to each other, thus building up the insulating structure. Various insulating materials, provided in particle size, may be used; for example, cork, kapok, asbestos, mineral wool, and various ones of the foamed elastomers such as foam polyurethane or polystyrene. Particle sizes are preferably less than one-quarter inch in the maximum dimension, although particles of somewhat larger size may be employed. The preferred insulating particulate material is an expanded polystyrene foam plastic which is available in bead form of less than approximately $\frac{3}{16}$ of an inch in diameter. The insulation material may be coated with a water-absorbing powdered material, such as cement, or other hydraulic-setting water-absorbing material. The latex supplied to the gun is preferably a butadiene-styrene latex (aqueous emulsion) which upon loss of excess moisture enters into a green cure, providing an adhesive capable of bonding the insulation particles together and to a structural surface. The gun of the invention generates a latex-air mist externally of the gun proper through which the insulation particles pass and in so passing are coated with the latex. The cement or similarly powdered material coating the insulation particles takes up excess moisture from the aqueous butadiene-styrene latex to effect a green cure of the latex, with the result that there is present on the surface of the insulation particles an adhesive capable of bonding the particles together and to a surface, such as the interior of a container.

A preferred form of the gun of the invention is designed especially for the building up of an insulating structure about an object or objects packed in a container or carton. The gun in this preferred form is fed by gravity from an overhead bin and, hence, there is no need for an air stream to deliver the insulation particles from a storage reservoir. The gun is provided with a barrel having an annular, outer passageway for the passage of the particulate material which will ordinarily be an insulating material. The spray gun contains a liquid spray nozzle located inwardly of the annular passageway and disposed along the longitudinal axis of the barrel. The outer ejection end of the spray nozzle is spaced adjacent to the outer end of the barrel. Means are provided for forming a curtain of air about the spray (i.e., between the spray and insulation particles) as the spray is ejected from the spray nozzle.

It has been found more desirable to provide the beads or other particulate material in an outer, annular pattern or tubular stream with the spray being formed by an inwardly located spray nozzle. This arrangement is superior to an arrangement where the stream of beads is disposed on the inside and the spray is formed outwardly thereof and directed inwardly as in the latter there is a tendency for the bead stream to collapse into a more tight column which may become difficult to wet with the spray.

The provision of the air curtain is a highly desirable feature of the gun of the invention. It has been found that in the absence of the air curtain the light density insulation particles will contact the liquid spray too early, resulting in an interference with the proper atomization and spreading of the liquid spray which leads to a non-uniform wetting of the beads. It has been found that the gun will not operate satisfactorily without the provision of the air curtain about the liquid spray nozzle. The curtain of air serves to forestall early contact of the light density particles and spray, thus avoiding inadequate atomization of the liquid.

When the gun is being used in a substantially vertical position for the formation of insulation in a carton or the like, it is not ordinarily necessary that the insulation particles or beads be delivered in an air stream, as it is possible to provide the beads to the annular passageway of the gun by gravity feed from an overhead bin. The aforementioned means for forming a curtain of air about the centrally disposed, liquid spray nozzle is a feature that is usable with either a gravity fed gun or an air-stream fed gun.

It has been found that the annular particulate passageway is desirably provided with longitudinally extending ribs to assure that the beads being ejected assume a substantially full peripheral pattern. In the absence of such longitudinally extending ribs located within the annular passageway, there is a tendency in a gravity fed gun for the insulation particles to leave the gun about only a limited arc of the annular passageway.

In a presently less preferred embodiment, multiports located in a circular pattern are used for bead ejection. It is not necessary, although preferred, that the insulation beads or particles be ejected in a circular pattern. The insulation beads may be ejected from the gun in other annular patterns such as a triangular or rectangular.

Broadly speaking, the process of the invention for wetting particulate material with a liquid involves creating an air suspension of the liquid with the liquid being sprayed under pressure in an expanding pattern from a vertex. The particulate material is delivered in an annular pattern which may be a tubular stream to the liquid-air suspension. An annular curtain of air which may be a tubular stream is provided concentrically of the annular particulate pattern between the sprayed liquid and the particulate material adjacent the vertex of the liquid-air suspension. This annular air curtain serves to delay the contact of the particulate material by the liquid spray. The annular air curtain and the particulate material, as well as the liquid-air suspension all move in the same general direction.

It has been found that it is important to the operation of the gun of the invention that the small passages of the device be suitably purged of the aqueous rubber latex following each use of the gun. Of all the various materials investigated, it has been found that only aqueous detergent solutions will adequately purge the passages and it has also been found that it is best that the gun following purging have its passages left filled with the detergent solution until the next use of the device. Various detergent agents may be employed including the alkali salts of fatty acids, various ones of the sulfonated fatty acids, and sulfonated fatty alcohols. Other ones of the available commercial wetting agents may be employed.

The gun and process of the invention are especially adapted to the handling of lightweight particulate material having densities typically within the range of 0.5 to 6 pounds per cubic foot of the material. The device and process are especially suitable for use with expanded polystyrene beads. Polystyrene beads vary considerably in density but typically have a density falling within the range of ¾ lb. per cu. ft. to 1 lb. per cu. ft. It will be appreciated that higher density expanded polystyrene beads and various other insulating materials, provided in particle size, may be used, including kapok, cork, asbestos, mineral wool, and various ones of the foam plastics such as foam polyurethane. It is the lightweight characteristic of the various particulate insulating materials that make difficult the application through a spray technique.

The foregoing objects, advantages, features, and results of the present invention, together with various other objects, advantages, features, and results thereof, which will become apparent to those skilled in the art in light of this disclosure, may be attained with the exemplary embodiment of the invention described in detail hereinafter and illustrated in the accompanying drawing in which.

Figures 1, 2, 3:
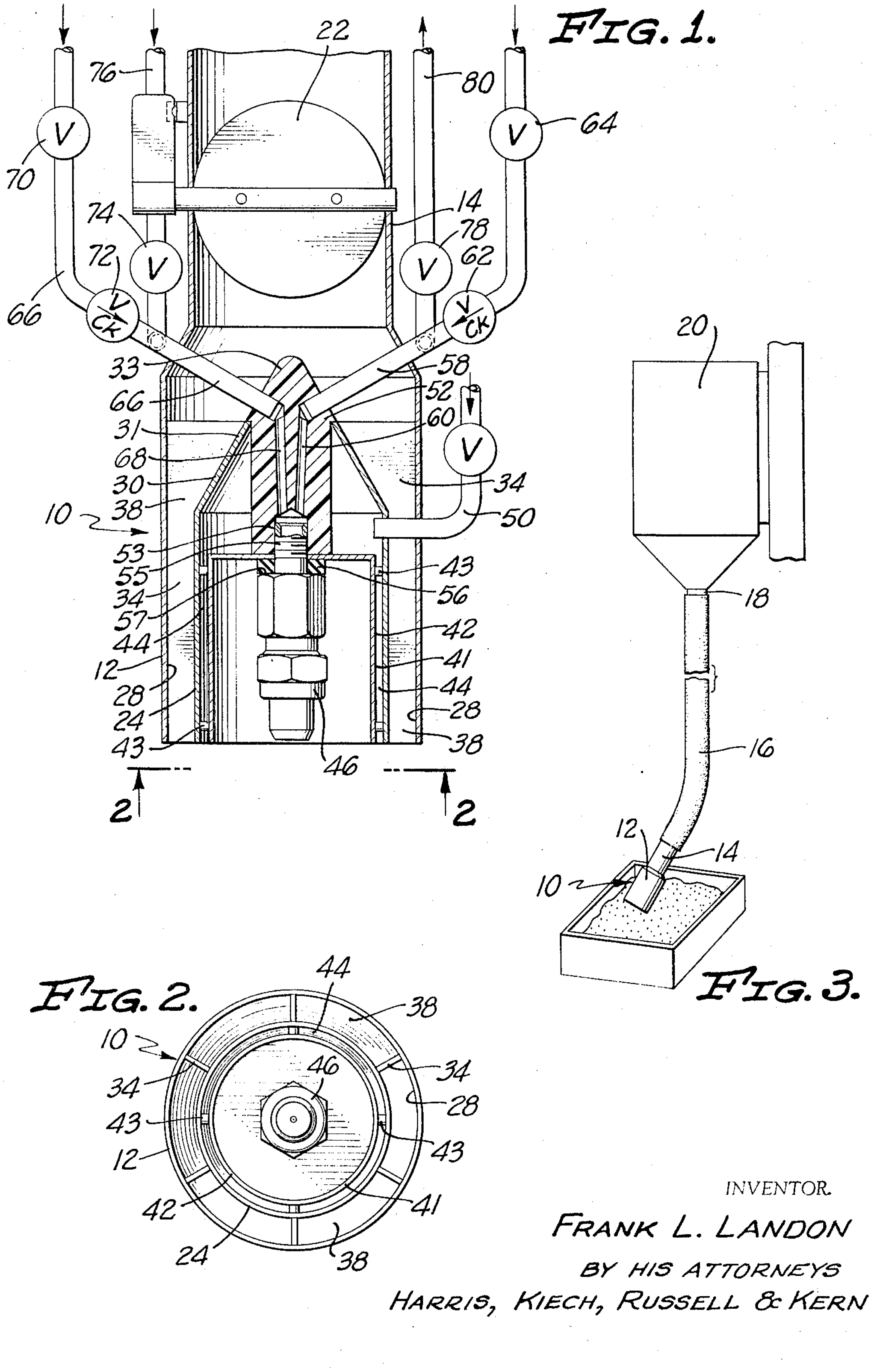
FIG. 1 is a longitudinal sectional view, partly in elevation, of a preferred embodiment of the spray gun of the invention.
FIG. 2 is an end elevational view taken from the site of line 2—2 of FIG. 1.
FIG. 3 is a view partly in elevation and partly isometric, illustrating the use of the spray gun of the invention with an overhead bin in the filling of a container with a shock-absorbing insulating structure.

The spray gun 10 of the invention in its preferred embodiment of the drawing comprises a circular, tubular outer shell 12 which at its inlet end is necked down to provide a circular sleeve 14 over which a flexible conduit 16 is placed. The other end of the flexible conduit in the particular installation illustrated is connected to a downspout 18 of a bin 20. The bin 20 holds polystyrene insulation beads or other particulate material that is being sprayed. In a preferred form of the invention the beads are coated with a water-absorbing material such as gypsum plaster or cement. In the particular installation illustrated the beads are delivered by gravity to the gun 10 from the overhead bin 20.

An air stream may be employed rather than gravity feed for delivery of the polystyrene insulation beads or other particulate material to the gun 10. However, it has been found that for the buildup of an insulation structure in a carton or container as in FIG. 3, delivery of beads by gravity is adequate.

In the embodiment illustrated, the sleeve 14 of the spray gun 10 is provided with a butterfly valve 22 for controlling the flow of the particulate material to the gun.

The outer shell or barrel 12 of the spray gun 10 houses a concentrically located, inner, tubular member 24. The inner tubular member 24, together with the outer shell 12, defines an annular, outer passageway 28. It will be seen that the inner tubular member 24 constitutes the inner wall of the annular passageway 28 with the outer shell 12 making up the outer wall of the passageway. In the embodiment illustrated, the inner tubular member 24 is closed at its inner end by an end member 30 which comprises a truncated cone 31 that has an apex 33 which may be formed of plastic located upstream and adjacent the sleeve 14 of the spray gun. Referring to FIG. 1, it will be seen that the apex 33 of the cone end member 30 is adjacent the butterfly valve 22 when that valve is located in its open position, as shown. Other dome-shaped pieces having a less sharp apex may be used rather than the particular cone configuration illustrated. The cone end member 30 with its domed top or plastic apex 33 uniformly spreads the polystyrene insulation beads or other particulate material around the annular, outer passageway 28.

It has been experienced at times that there is a tendency for the beads following their initial distribution by cone 30 to bunch about a limited arc of the annular passageway. When this occurs, the peripheral ejection pattern for the polystyrene beads will have gaps or limited arcs wherein there are substantially no beads. To remedy this, in the preferred embodiment of the spray gun as illustrated, there are provided longitudinally extending ribs 34 which respectively extend across the width of the passageway 28. The ribs 34 are several in number (six in the embodiment illustrated) and divide the annular passageway 28 into several (six) elongated compartments 38.

The inner tubular member 24 at its outer end supports a cup 41 with spacers 43 therebetween. The longitudinal axis of the cup 41 coincides with the longitudinal axis of the outer shell 12. Cylindrical sidewall 42 of the cup 41 is closely spaced to the inner tubular member 24 and the space therebetween defines an annular air passageway 44. A liquid spray nozzle 46 is disposed lengthwise along the longitudinal axis of the outer shell and of the cup 41. The outer end of the spray nozzle 46 is located adjacent the end of the barrel (for example, just beyond the outer end of the barrel or short of the barrel end as illustrated). The air passageway 44 is preferably located immediately adjacent the outer particulate passageway 28 as shown and may be moved inwardly toward the nozzle 46 but desirably is located at least ¾ inch from the axis of the spray nozzle. Placement of the air passageway 44 too close to the spray nozzle 46 will deform the spray jet.

The air passageway 44 delivers a curtain of air about the outwardly expanding spray cone which air curtain serves to forestall early contact of the polystyrene beads or other particles being sprayed. It has been found that in the absence of the curtain of air, beads from the outer annular passageway 28 will prematurely engage the spray cone and interfere with proper atomization of the liquid. The curtain of air is a particularly desirable feature of the gun of the invention and may be used either with a gravity fed gun or a gun in which the polystyrene beads or other particles are delivered by an air stream. Pressurized air is supplied to the interior of the inner tubular member 24 and to the air passageway 44 about the spray nozzle 46 by a laterally extending air pipe 50.

The previously mentioned apex 33 which closes the smaller end of the truncated cone 31 is an integral part of a plastic structural member 52 which is disposed axially of the gun. The structural member 52 at its outer end has an internally threaded, axially disposed bore 53 which engages an inner, threaded end 55 of the spray nozzle 46. The spray nozzle 46 passes through a central hole of the cup 41 and serves to hold the cup against the outer end of the plastic structural member 52 with a rubber washer 56 located between the inside bottom of the cup 41 and a shoulder 57 of the spray nozzle 46.

Liquid adhesive is supplied to the spray nozzle 46 by a lateral line 58 extending through the walls of the outer shell 12 to a passage 60 of the plastic structural member 52. Backflow through the adhesive line 58 is prevented by a check valve 62. Flow through the lateral line 58 is regulated by a valve 64. Where a synthetic rubber latex is being used as the adhesive, it is advisable to clean the gun with a suitable solvent such as an aqueous detergent solution provided by a second lateral line 66 which connects into a solvent passage 68 which generally parallels the adhesive passage 60 of the structural member 52. Both passages 60 and 68 open into the axial bore 53 at the outer end of the structural member 52 and from there into the spray nozzle 46. Flow through the solvent line is regulated by a valve 70 and by a check valve 72 which prevents backflow through the line 66. Valves 64 and 70 are preferably coupled together so as to synchronously open the valve 70 of the solvent line to permit flushing and displacement of the adhesive from the spray nozzle. The foregoing is desirably automatically accomplished with each operation of the gun.

In shutdown of the gun as distinguished from an intermittent operation, the flapper valve 22 is first closed; thereafter, the adhesive valve 64 is closed and valve 70 of the solvent line opened (preferably automatically) to permit flushing of the adhesive from the spray nozzle 46. After a brief period of flushing with the solvent, valve 70 of the solvent line 66 is closed and valve 74 of a water inlet line 76 is opened along with valve 78 of a water outlet line 80. After a brief interval to permit water flow through the nozzle 46 to clear the nozzle of solvent, the operator places his finger or other object over the outlet of the nozzle and thereby causes the water entering through line 76 to flush passages 68 and 60 of the structural member 52, leaving the gun through the lateral line 58 and the water outlet line 80. It will be seen that with this arrangement, it is possible to water-clean the nozzle 46 and the passage lines 60 and 68 of the structural member 52. The water inlet line 76 and water outlet line 80 are connected respectively to the lateral lines 66 and 58 mainly adjacent the check valves 72 and 62.

Although exemplary embodiments of the invention have been disclosed herein for purposes of illustration, it will be understood that various changes, modifications and substitutions may be incorporated in such embodiments without departing from the spirit of the invention as defined by the claims which follow.

I claim:

1. A process for wetting particulate material with a liquid, said process comprising:
- creating an air suspension of the liquid with the liquid being sprayed under pressure in an expanding pattern;
- delivering the particulate material in an annular pattern to the liquid-air suspension; and
- providing an annular curtain of air concentric of the annular particulate pattern between the sprayed liquid and the particulate material adjacent the base of the liquid-air suspension pattern, said annular air curtain serving to delay the contact of the particulate material with the liquid spray.

2. A process in accordance with claim 1 wherein the annular particulate pattern and annular air curtain are circular.

3. A process for wetting particulate material with a liquid, said process comprising:
- creating an air suspension of the liquid with the liquid being sprayed under pressure in an expanding pattern from a vertex;
- delivering the particulate material under gravity flow in an annular pattern to the liquid-air suspension; and
- providing an annular curtain of air concentric of the annular particulate pattern between the sprayed liquid and particulate material adjacent the vertex of the liquid-air suspension, said annular air curtain serving to delay wetting of the particulate material by the liquid spray.

4. A process for wetting light density particulate material with a liquid, said process comprising:
- creating an air suspension of the liquid with the liquid being sprayed under pressure in an expanding cone from an apex;
- delivering the particulate material under gravity flow in an annular curtain to the liquid-air suspension, said particulate material having a density of in the range 0.5 to 6 pounds per cubic foot; and
- providing an annular curtain of air generally paralleling the annular particulate curtain between the sprayed liquid and the particulate material adjacent the apex of the expanding cone, said annular air curtain serving to delay contact of the particulate material with the liquid spray, and with the air curtain, particulate material, and liquid-air suspension all moving in the same general direction.

5. A process in accordance with claim 4 wherein the particulate material is comprised of beads of expanded polystyrene coated with a water-absorbing material and the liquid is an aqueous latex.

6. A process for bonding insulation particles together for building up of an insulation layer, said process comprising:
- creating an air suspension of an aqueous latex with the latex being sprayed under pressure in an expanding pattern from a vertex;
- directing a tubular stream of light density particulate material coated with a water-absorbing material into the expanding liquid-air suspension pattern with said tubular stream flowing in the same general direction as the liquid-air suspension; and
- providing a tubular stream of air about the tubular particulate stream adjacent the vertex of the liquid-air suspension pattern, said tubular air stream flowing in the same direction as the tubular particulate stream.

7. A process in accordance with claim 6 wherein the particulate material is comprised of beads of expanded polystyrene and the aqueous latex is an aqueous dispersion of a butadiene-styrene copolymer.

8. In a spray gun structure for wetting light density particulate material with a liquid, said gun structure comprising:
- means for forming an annular stream of particulate material exteriorly of the gun and including an annular outer passageway for movement of the particulate material in said gun structure;
- nozzle means for creating an air suspension of the liquid exteriorly of the gun and including means for spraying the liquid under pressure in an expanding pattern to intercept the annular particulate stream and with the outlet of the nozzle means lying on the longitudinal axis of the annular outer passageway; and
- means for forming an annular stream of air exteriorly of the gun between the nozzle means and the annular particulate stream, said latter means including a second annular passageway in said gun structure paralleling said outer particulate passageway and disposed inwardly thereof.

9. In a spray gun, the combination comprising:
- a barrel having an annular outer passageway for the passage of particulate material;
- a liquid spray nozzle located inwardly of the annular passageway and disposed along the longitudinal axis of the barrel with the outer ejection end of said spray nozzle being adjacent to the outer end of the barrel; and means for forming a curtain of air immediately adjacent the end of the gun barrel and about the spray ejected from the spray nozzle, said curtain of air serving to forestall early contact of particulate material and spray.

10. In a spray gun, the combination comprising:

a barrel having an annular outer passageway for the passage of particulate material with an outlet therefrom at the outer end of said barrel;

a liquid spray nozzle located inwardly of the annular passageway and disposed lengthwise of the axis of said barrel with the outer end of said spray nozzle being adjacent to the outer end of the barrel; and means for forming a curtain of air immediately adjacent the end of the barrel and about the spray ejected from the spray nozzle, said means including an inner air passageway with an outlet therefrom at the outer end of said barrel, said inner air passageway generally paralleling the outwardly disposed particulate outer passageway and being spaced outwardly from the spray nozzle.

11. In a spray gun, the combination comprising:

a barrel having an annular outer passageway for passage of particulate material, said annular passageway having spaced longitudinally extending ribs across the width of the passageway, said ribs dividing the annular passageway into several elongated and adjoining compartments;

a liquid spray nozzle disposed lengthwise along the axis of the gun barrel and away from the annular outer passageway; and means for forming a curtain of air between the spray ejected from the spray nozzle and the outer annular passageway, said curtain of air serving to delay contact of particulate material and spray.

12. A spray gun installation comprising:

a spray gun including a gun barrel having an annular outer passageway for the passage of particulate material, a liquid spray nozzle located inwardly of the annular passageway and disposed lengthwise of the axis thereof, and means for forming a curtain of air immediately at the end of the gun barrel between the spray nozzle and the annular outer passageway, said curtain of air serving to forestall early contact of particulate material and spray;

an overhead bin for the particulate material and supported above the spray gun;

a flexible movable conduit connecting the overhead bin and the spray gun; and means for delivering liquid to the spray nozzle of the spray gun.

13. In a spray gun, the combination of:

an annular outer passageway for the passage of particulate material;

a tubular member, said tubular member providing the inner wall of the annular passageway with said tubular member being closed at its inner end by an end member with the longitudinal axis of said end member coinciding with the axis of the tubular member and of the annular passageway;

a liquid spray nozzle located within the tubular member inwardly of the annular outer passageway and disposed lengthwise of the axis of said passageway and of said tubular member; and means for forming a curtain of air about the spray ejected from the spray nozzle, said curtain of air serving to forestall early contact of particulate material and spray.

14. In a spray gun, the combination comprising:

an annular outer passageway for the passage of particulate material, said annular passageway having spaced, longitudinally extending ribs across the width of the passageway, said ribs dividing the annular passageway into several elongated compartments;

a tubular member disposed inwardly of said annular passageway with the wall of the tubular member providing the inner wall of the annular passageway, said tubular member being closed at its inner end by an end member with the longitudinal axis of the tubular member and of the annular passageway coinciding;

a liquid spray nozzle located within the tubular member inwardly of the outer annular passageway and disposed lengthwise of the axis of said tubular member;

means for forming a curtain of air between the spray nozzle and the annular particulate passageway, said means including an annular air passageway immediately adjacent and inwardly disposed of the annular particulate passageway; and means for providing pressurized air to said air passageway.

15. A process as defined in claim 1 wherein said liquid is sprayed through the passages of a gun and said process includes the step of purging said liquid from the passage of the gun.

References Cited by the Examiner

UNITED STATES PATENTS

| | | | |
|---|---|---|---|
| 2,478,557 | 8/1949 | Bell et al. | 239—291 |
| 2,597,573 | 5/1952 | Groff | 239—291 |
| 2,721,147 | 10/1955 | Sullivan | 259—147 |
| 2,766,073 | 10/1956 | Bergstrom | 239—424 |
| 2,929,436 | 3/1960 | Hampshire | 239—423 |
| 3,057,273 | 10/1962 | Wilson | 239—112 |
| 3,073,534 | 1/1963 | Hampshire | 239—428 |
| 3,091,403 | 5/1963 | Schraber et al. | 239—428 |
| 3,176,922 | 4/1965 | Decker | 239—112 |
| 3,179,341 | 4/1965 | Plos et al. | 239—112 |
| 3,199,790 | 8/1965 | Giesemann | 239—424 |
| 3,224,680 | 12/1965 | Burnside et al. | 239—112 |

M. HENSON WOOD, Jr., *Primary Examiner.*

R. S. STROBEL, *Assistant Examiner.*